Dec. 29, 1953 — W. M. HOWSER — 2,664,265
PRESSURE SEALED VALVE
Filed June 21, 1951
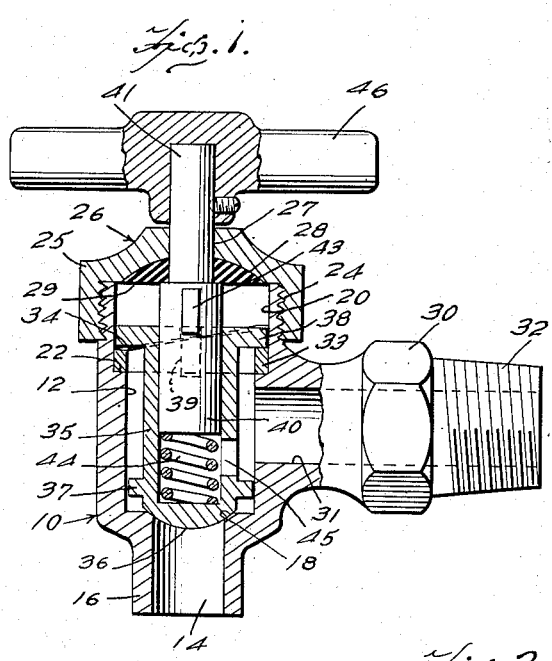
Fig. 1.
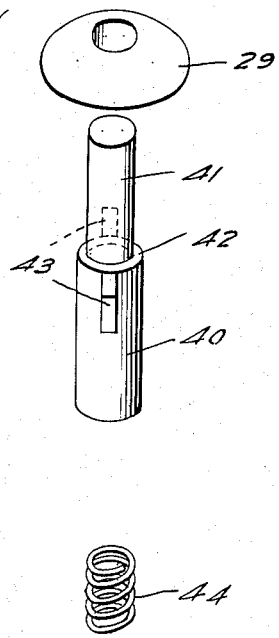
Fig. 2.
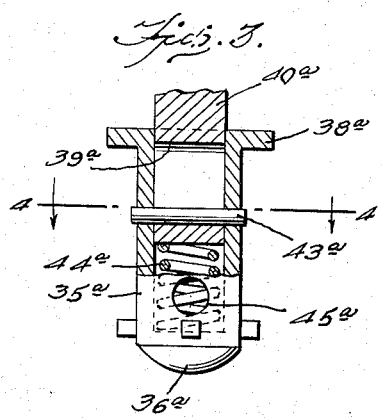
Fig. 3.
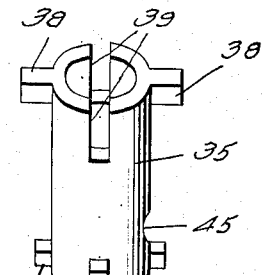
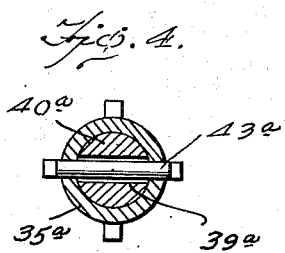
Fig. 4.
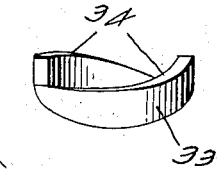
INVENTOR.
Walter M. Howser
BY
Wilfred E. Lawson
ATTORNEY Patented Dec. 29, 1953

2,664,265

UNITED STATES PATENT OFFICE 2,664,265

PRESSURE SEALED VALVE

Walter M. Howser, Indianapolis, Ind.; Julia M. Howser, administratrix of said Walter M. Howser, deceased Application June 21, 1951, Serial No. 232,689

2 Claims. (Cl. 251—132)

This invention relates generally to sealing devices controlled or actuated by fluids under pressure and susceptible of application to a number of devices.

A primary object of the present invention is to provide a novel means of effecting the maintenance of a seal between two faces or surfaces by the action of fluid under pressure whereby relative movement between said surfaces is permitted, one application of the invention being in the flow line of a fluid such as air, water, steam or the like wherein a seated member shuts off the flow of such fluid and the seating of the member is maintained tight by the action of the pressure of the fluid in the line.

Another object of the invention is to provide a sealing device of the character stated, wherein the opening of the seated member is effected by rotating a control element which in addition to effecting the retraction of such member element from its seat also places a sealing element under spring pressure whereby to increase the effectiveness of such sealing element.

A still further object of the invention is to provide a device of the character stated wherein the retraction and advance of the valve element from and toward its seat is effected without the employement of the usual threaded shaft such as is commonly employed in various types of faucets, the retraction of the valve from its seat in the present device being effected by means of cam tracks and cam followers.

A still further object of the invention is to provide in a device of the above described character a hollow barrel valve element having a piston member slidably disposed therein and connected therewith by a key and slot, said barrel being caused by the inner action of cams and cam followers to shift axially on the piston upon the rotation of the latter to unseat the valve and such shifting in the unseating of the valve effecting the compression of a spring in the barrel between the valve end of the barrel and the piston to apply pressure against and improve the effectiveness of a compressible sealing body.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view partly in vertical or longitudinal section and partly in elevation of a faucet showing one application of the present invention.

Figure 2 is an exploded view of the elements of the device, which are enclosed in the housing.

Figure 3 is a fragmentary detail illustrating a modified coupling between the piston and the valve barrel.

Figure 4 is a sectional view taken substantially on the line 4—4 of Figure 3.

Referring now more particularly to the drawing the invention herein set forth is illustrated as incorporated in a hydrant faucet and will be so described but it is to be understood that the invention is not limited in any respect by such illustration or description as it will be readily obvious to those versed in the art that it may be used in a variety of mechanical devices where there is a requirement for a fluid tight seal between two relatively movable or moving parts, the present invention providing a means whereby such seal can be maintained by pressure of the fluid around such parts.

In the illustration the numeral 10 generally designates an elongate housing having a circular chamber 12 which, at one end, is in communication with a passage 14 which in the present illustration forms the outlet for the nozzle 16 of the faucet as shown.

The inner end of the passage 14 where it opens into the cylindrical chamber 12 is formed to provide the annular valve seat 18.

The opposite end of the chamber is enlarged or of increased diameter whereby is provided the circular recess 20, at the inner end of which, where it joins the chamber 12 is formed the annular shoulder 22. The recess 20 opens through the end of the body or housing 10 and the housing at such open end or head end, is externally screw threaded as indicated at 24 to receive the internally threaded skirt portion 25 of the cap which is generally designated 26.

The cap 26 has a central passage 27 therethrough and at the inner end of the passage the cap has its underface recessed as indicated at 28 to receive the washer 29 which, as shown, is of plano-convex form, the convex surface of the washer positioning in the recess 28 and the plane surface being parallel with the inner side of the cap.

Extending laterally from the side of the housing 10 is the tubular stem 30 through which is formed the fluid passage 31 which opens into the chamber 12 substantially midway between the ends thereof. The outer end of this stem 30 is here shown as being externally screw threaded as at 32 to facilitate the attachment of the faucet to a fluid pipe line.

Fitting snugly within the circular recess 20 and resting upon the shoulder 22 is a cam collar 33, the top surface of which is divided into the two semi-circular spiral cam tracks 34.

The inside diameter of the collar 33 is the same as the inside diameter of the chamber 12 and extending through the collar and disposed within and coaxially of the chamber 12 is a valve barrel 35, the lower end of which is closed by the downwardly directed convex wall 36 which forms a valve element which is adapted to rest or seat on the annular valve seat 18 in the manner illustrated.

To facilitate the maintenance of the barrel centered in the chamber 12, the lower end of the barrel has projecting therefrom a number of radially directed lugs 37 which are of equal length and have sliding contact with the wall of the chamber.

At its upper end the valve barrel 35 carries the two diametrically positioned radially outwardly extending cam followers or fingers 38, each of which rests upon a cam track 34 and when the valve 36 is at rest upon the seat 18 these followers 38 will be positioned adjacent to the lower ends of the tracks 34.

The upper end of the cam barrel is, of course, open as shown and at diametrically opposite positions in a plane perpendicular to the fingers 38, are the short longitudinal key slots 39, the purpose of which will be hereinafter set forth.

As is readily apparent upon reference to Figure 1 the top end of the valve barrel 35 is spaced a substantial distance from the underface of the cap and from the washer 29 thus providing room for the barrel to move axially as the fingers ride toward the high points of the cam tracks 34 in the operation of retracting the valve 36 from its seat.

Slidably disposed within the barrel 35 is the piston 40 which at its outer end carries the reduced stem or shaft 41. Around the end of the shaft 41 where it joins the piston 40, is the flat shoulder 42 which bears against the inner face of the washer packing 29, the stem or shaft 41 being extended through the washer packing and through the cap passage 27 as shown.

Adjacent to the outer end of the piston 40 are the diametrically oppositely positioned keys 43, each of which engages in the outer end portion of a slot 39 when the valve is closed as shown.

The piston 40 is of less length than the inside of the valve barrel 35 so that there remains at all times a space between the inner end of the piston and the valve end 36 and in this space is located a coil spring 44 which is under compression and normally urges the outward movement of the piston from the barrel. Since, the shoulder 42 of the piston is positioned against the washer packing, it will be seen that the outward thrust of the spring presses the shoulder against the washer, and this pressure is increased by the movement of the barrel in a direction to unseat the valve.

As is readily seen the outside diameter of the barrel 35 is materially less than the inside diameter of the chamber 12 so that there is a fluid space entirely around the barrel into which fluid from the passage 31 passes.

Communicating with this space between the barrel and the wall of the chamber 12 is a pressure port 45 formed through the wall of the barrel and opening thereinto just below the inner end of the piston 40.

The operation of the valve is effected by rotating the shaft and piston in a suitable manner. There is here shown fixed to the outer end of the shaft above the cap 26, a handle or wheel 46 such as is commonly employed on faucets and the like. However, it is to be understood that the invention is not limited to the use of this particular means for turning the barrel as various other elements may be employed depending upon the conditions under which the sealing device is used.

From the foregoing description it will be readily apparent that when the present device is used in fluid lines where the fluid is maintained under high pressure, such fluid entering the chamber 12 by way of the passage 31 will pass into the barrel 35 beneath the piston, by way of the port 45 and will also fill the space between the barrel and the wall of the chamber and will assist in maintaining the valve 36 firmly positioned on its seat 18. The pressure, as will be readily apparent, will not only be against the inner side of the valve 36 but against the bottom end of the piston 40.

When the valve is to be opened, the piston is rotated by whatever means may be employed fixed to the outer end of the stem 41 and such rotation of the piston will effect the rotation of the barrel through the connection of the keys 43 in the slots 39. The rotation of the barrel will cause the cam follower fingers 38 to ride up or toward the high ends of the spiral cam tracks 34 thus effecting the axial movement of the barrel on the piston, the keys 43 meanwhile entering the slots 39. Thus the valve 36 will be shifted or retracted from its seat 18 and in so shifting the spring 44 will be placed under additional tension by being compressed between the inner end of the piston and the valve 36.

Upon the closing of the valve the pressure within the chamber will enter the barrel by way of the port 45 and function to maintain a tight seal between the valve face and the face of the seat 18 on which the valve rests.

In Figures 3 and 4 there is illustrated another method of slidably coupling the valve barrel and the lower or inner end of the piston.

In the modified construction the piston is designated 40a and is provided adjacent to its lower end with the longitudinally extending transverse slot 39a. This slotted portion of the piston is positioned entirely within the upper end of the valve barrel which is designated 35a.

Beneath the lower end of the piston 40a and the bottom of the barrel 35a is the expansion spring 44a which urges the piston upwardly.

The upward movement of the piston is limited by a pin 43a which passes through openings in the wall of the barrel and through the piston slot 39a.

It will be obvious that the piston and barrel assembly function in the same manner in this modified construction as in the construction shown in Figure 1 when the assembly is placed within a suitable chamber such as the chamber 12 of the housing 10. When so placed the ears 38a ride on the spiral cam tracks 34 and the valve element 36a will position on the seat 18 when the barrel is forced inwardly.

The numeral 45a designates the fluid admission aperture in the barrel by which the pressure may be applied against the back of the valve element 36a forming the lower end of the barrel.

It will be apparent from the foregoing that any increase in pressure in the fluid line will only result in the tighter or firmer seating of the valve, in either of the two forms described, so that leakage is positively prevented.

It is also to be pointed out that the present valve functions without the employment of the usual threaded stems and without the use of packing washers or valve washers which become destroyed or may be affected by the fluids passing through the valve. Also it will be readily apparent that where the valve parts are of metal, the valve disk 36 can only become more efficient in its sealing action as it is used because of the slight rotary motion which it has with respect to the seat 18 as it rises from and returns to the seat. In other words the valve is continually grinding itself in to a perfect seat as it is used so that the possibility of leakage occurring through long use is avoided.

While reference has been made to a valve or sealing device of the character herein set forth being constructed of metal it will also be readily apparent that such device may be formed of many other materials without affecting its efficiency.

It is additionally to be pointed out and emphasized that the present invention provides a secure sealing of internal pressures within any chamber such as fluid faucets, steam valves, air valves and the like and whatever pressures are applied within such chambers, this pressure sealing unit is forced to act automatically. Also, as previously set forth, the higher the pressure in the chamber, the tighter the cylindrical body carrying valve is forced to the sealing seat.

A further advantage in the disclosed pressure seal means resides in the application of pressure, or force, in two directions to accomplish a simultaneous double sealing action, in that the pressure entering the pressure port 45, 45a, not only urges the barrel, or cylindrical body 35, toward the surface 18 but also urges the piston axially to assist in maintaining a tight seal between the shoulder 42 and the packing washer 29.

I claim:

1. In a valve of the class described, a body having a cylindrical chamber open at its top end and provided with a reduced outlet in its lower end, a service coupling inlet opening through the side of said body intermediate its ends, a barrel within said chamber also having a cylindrical chamber open at its top end and closed at its lower end, said lower end of said barrel being rounded to seat in said outlet, lugs projecting in spaced relation about said barrel to center it within the body chamber, said barrel having a pair of oppositely disposed slots opening through its top end, an annular shoulder formed interiorly of the upper end of said body, an annular cam element seated on said shoulder and having its top edge formed to provide a pair of cam tracks merging one into the other, a bonnet threaded onto the upper end of said body and having an opening centered in its end, a stem depending through said bonnet opening, a piston on the inner end of said stem and slidably engaged in said barrel chamber, a handle on the outer end of said stem, a coil spring within said barrel chamber beneath said piston, a pair of oppositely disposed follower lugs projecting laterally from the upper end of said barrel adapted to ride said cam tracks and lift the barrel to free its lower end from said outlet, and a pair of oppositely disposed keys projecting laterally from the upper end of said piston to be engaged in said slots upon a downward movement of said stem to allow for a subsequent turning movement of said barrel and the follower lugs carried thereby relatively to said cam element, said spring being placed under compression during the downward movement of said piston and acting to forcibly return the barrel to its normal outlet closing position when said follower lugs drop from the high points of said cam tracks, said barrel having a laterally opening port communicating the interior of the body chamber for the entry of line pressure from the latter and the said service inlet.

2. The valve as defined in claim 1, with the inner side of the closed end of said bonnet formed to provide a circular recess and a packing washer seated within said recess and encircling said stem, said piston having a diameter somewhat greater than that of said stem whereby its upper end constitutes a shoulder which bears against said washer when it and the stem are normally disposed, said stem and piston being returned to normally elevated position by the expansion action of said spring simultaneously with its action in returning said barrel to outlet closing position.

WALTER M. HOWSER.

References Cited in the file of this patent

UNITED STATES PATENTS

| Number | Name | Date |
|---|---|---|
| 679,525 | Brophy | July 30, 1901 |
| 1,690,027 | Nelson | Oct. 30, 1928 |
| 1,944,155 | Dippman | Jan. 27, 1934 |
| 2,061,706 | Kiley | Nov. 24, 1936 |
| 2,417,901 | Bagsar | Mar. 25, 1947 |